US012557745B2

(12) United States Patent
Attleson

(10) Patent No.: US 12,557,745 B2
(45) Date of Patent: Feb. 24, 2026

(54) AUTOMATED AEROPONICS GARDENING SYSTEM

(71) Applicant: Michael Dean Attleson, Lyle, MN (US)

(72) Inventor: Michael Dean Attleson, Lyle, MN (US)

( * ) Notice: Subject to any disclaimer, the term of this patent is extended or adjusted under 35 U.S.C. 154(b) by 0 days.

(21) Appl. No.: 18/667,207

(22) Filed: May 17, 2024

(65) Prior Publication Data

US 2024/0298588 A1    Sep. 12, 2024

Related U.S. Application Data

(63) Continuation-in-part of application No. 18/142,818, filed on May 3, 2023.

(60) Provisional application No. 63/469,613, filed on May 30, 2023, provisional application No. 63/473,376, filed on May 25, 2022.

(51) Int. Cl.
    *A01G 31/02* (2006.01)
    *A01G 27/00* (2006.01)

(52) U.S. Cl.
    CPC ........... *A01G 31/02* (2013.01); *A01G 27/001* (2013.01); *A01G 27/003* (2013.01); *A01G 27/005* (2013.01); *A01G 31/065* (2025.01)

(58) Field of Classification Search
    CPC .... A01G 31/02; A01G 27/001; A01G 27/003; A01G 27/005; A01G 31/065
    See application file for complete search history.

(56) References Cited

U.S. PATENT DOCUMENTS

| | | | | |
|---|---|---|---|---|
| 2012/0167460 A1* | 7/2012 | Omidi | .................... | A01G 9/023 |
| | | | | 47/65.7 |
| 2019/0200551 A1* | 7/2019 | Walters | .................. | A01G 31/06 |
| 2020/0037526 A1* | 2/2020 | Sperry | .................. | A01G 9/025 |
| 2020/0163297 A1* | 5/2020 | Newitt | ..................... | F24F 5/00 |
| 2020/0236864 A1* | 7/2020 | Henry | ................. | A01G 27/003 |

* cited by examiner

*Primary Examiner* — Christopher D Hutchens
*Assistant Examiner* — Steven J Shur
(74) *Attorney, Agent, or Firm* — Johnson and Phung; Thomas N. Phung

(57) ABSTRACT

A rotatable, electric powered self-contained vertical plant housing and watering apparatus including an elongated plant-housing tower having a closed first end, a second end, a hollow interior, and a plurality of removable plant plug-supporting cups extending outward from a sidewall of the tower, a water column supported within the hollow interior of the tower in a fixed condition and running from proximal to the first end to the second end of the tower, a self-contained water basin connected to the second end of the tower and supporting the tower in a rotatably upright condition, a water pump located within the basin and pushing fluid within the basin up the water column for fluid distribution within the tower, and a motor driving a rotation of tower about the water column to provide all sides of the tower with equal sun and shade time.

17 Claims, 6 Drawing Sheets

FIG. 2

AUTOMATED AEROPONICS GARDENING SYSTEM

CROSS-REFERENCE TO RELATED APPLICATIONS

This application claims priority pending provisional patent application Ser. No. 63/469,613; filed on May 30, 2023; titled AUTOMATED AEROPONICS GARDENING SYSTEM.

FIELD OF THE INVENTION

This invention relates generally to aeroponics systems and, more specifically to a self-contained vertical plant watering apparatus with powered tower rotation.

STATEMENT REGARDING FEDERALLY SPONSORED RESEARCH OR DEVELOPMENT

None

REFERENCE TO A MICROFICHE APPENDIX

None

BACKGROUND OF THE INVENTION

Traditional gardening methods often face challenges such as limited space, inconsistent watering, and inadequate sunlight exposure, particularly in indoor environments. There is a need for a solution that addresses these challenges and promotes healthy plant growth effectively. The present invention is directed at addressing the need for efficient space utilization, consistent watering, and sunlight exposure for optimal plant growth.

SUMMARY OF THE INVENTION

Briefly, the present invention comprises a rotatable, electric powered self-contained vertical plant housing and watering apparatus that includes an elongated plant-housing tower having a closed first end, a second end, a hollow interior and a plurality of plant plug-supporting cups extending outward from a sidewall of the plant-supporting tower with each of the plant plug-supporting cups preferably angled between 35-85 degrees to a length of the tower.

Supported within the hollow interior of the plant-housing tower in a fixed condition is a water column that runs from proximal the first end to the second end of the plant-housing tower. Connected to the second end of the plant-housing tower is a self-contained water basin that functions to support the plant-housing tower in a rotatably upright condition with the plant-housing tower supported on a load-bearing roller-bearing system located with the water basin and stabilized vertically by an extended sleeve located on the lid of the basin.

Located within the water basin is a water pump that functions to push fluids supported within the water basin up the water column for fluid distribution at least proximal to the first end of the plant-housing tower and cascading back down to the water basin to promote maximum plant root saturation. The water pump may be connected to a water cycle controlling timer that functions by turning the water pump on and off at programable intervals.

The plant housing and watering apparatus also includes a programable motor driving a rotation of the plant-housing tower about the water column at fixed intervals, adjustable intervals, continuously or during only light hours for power conservation to provide all sides of the elongated plant-housing tower with equal sun and shade time with the programable motor including a motor-powered drive gear engaging a plurality of teeth located on a circumference of the plant-housing tower proximal to the second end of the plant-housing tower.

The plurality of plant plug-supporting cups may each include a stopper located in each of the plant plug-supporting cups to prevent a plant plug supported within the cup from completely sliding through the cup and the water column may include a fitted sleeve covering the water column to alleviate root twists within the plant-housing tower.

BRIEF DESCRIPTION OF THE DRAWINGS

FIG. 2 is a cross-sectional view of the rotatable, electric-powered self-contained vertical plant housing and watering apparatus of FIG. 1;

DESCRIPTION OF THE PREFERRED EMBODIMENT

Figure 1:
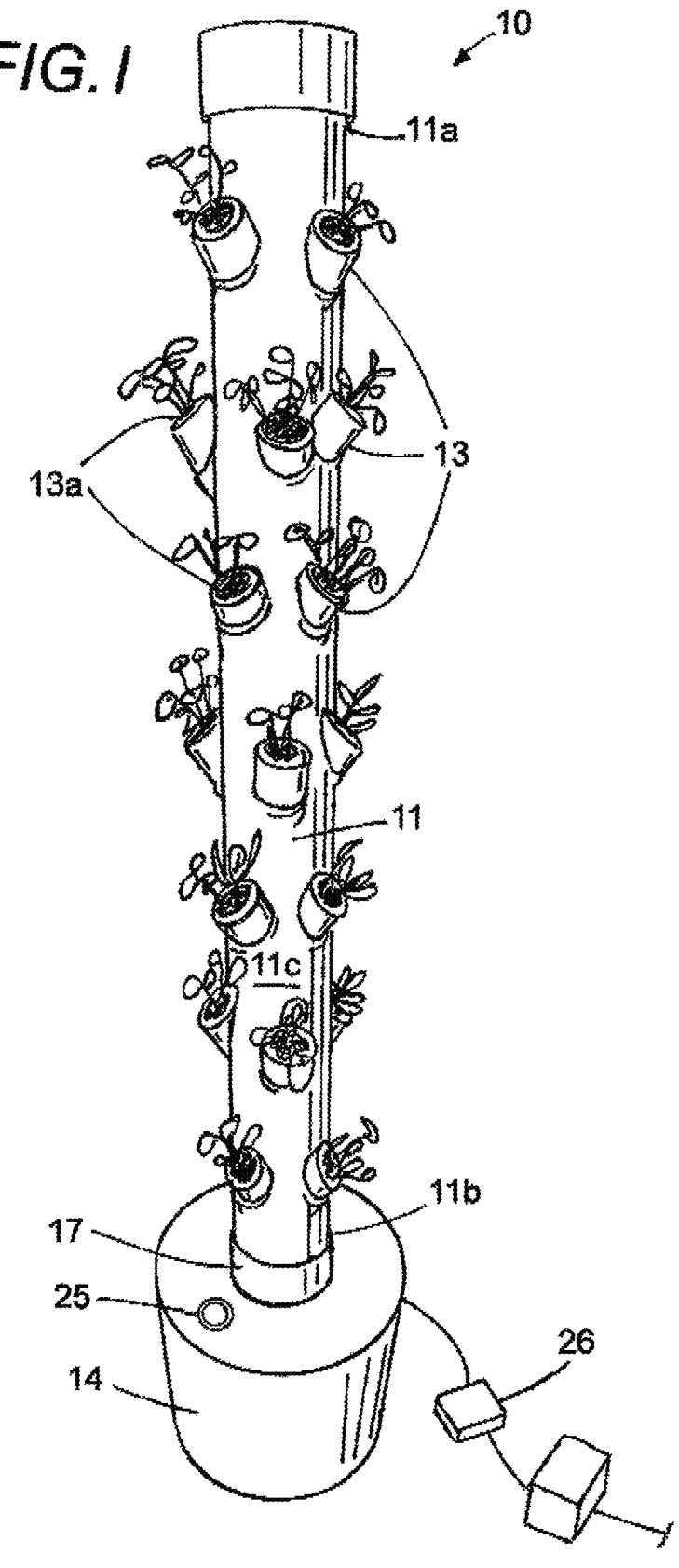
FIG. 1 is a perspective view of a rotatable, electric-powered self-contained vertical plant housing and watering apparatus of the present invention.

The general purpose of the present invention, which will be described subsequently in greater detail, is to provide a fully automated vertical aeroponics gardening system such as a self-contained vertical plant watering apparatus with powered tower rotation that addresses the need for efficient space utilization, and consistent watering while allowing plants to receive sunlight from all angles, maximizing photosynthesis, and simultaneously providing intermittent shading to prevent sunburn on plant surfaces and breaks from wind while in operation.

There has thus been outlined the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the disclosing subject matter be regarded as including such equivalent constructions insofar as they do not depart from the spirit and scope of the present invention.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

In addition, the accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of any potential claims.

In general, the fully automated vertical aeroponics gardening system of the present invention is a self-contained vertical plant watering apparatus with powered tower rotation meant for plants such as but not limited to strawberries, romaine lettuce, various types of flowing plants, and other shallow-rooted plants but may be sized for larger rooted plant varieties. The automated vertical aeroponics gardening system may run off solar or household A/C power with a D/C converter or any other type of similar sources and may be used not only for the outdoors but also near large well-lit windows or artificial lighting indoors.

Figure 2:
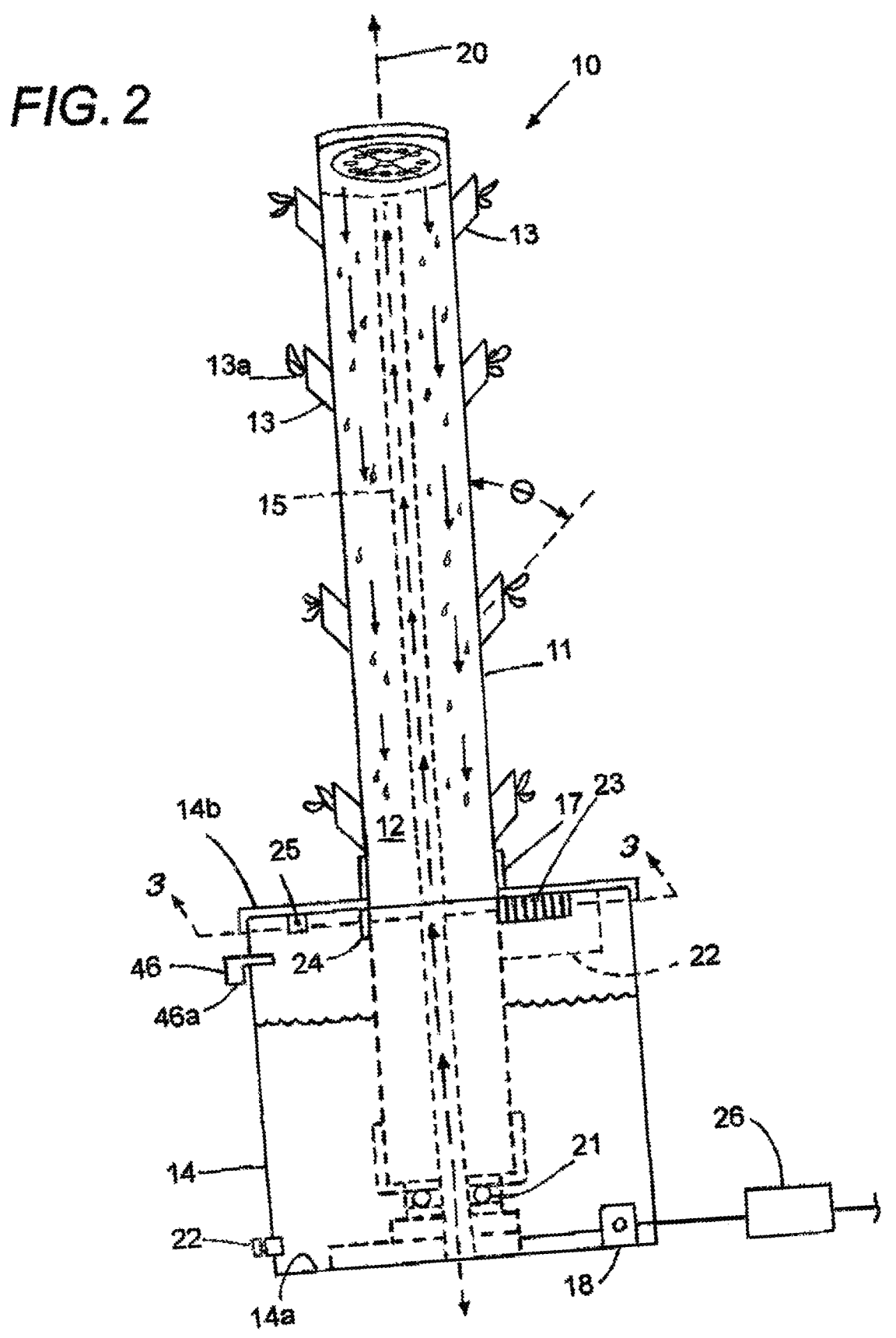
Figure 3:
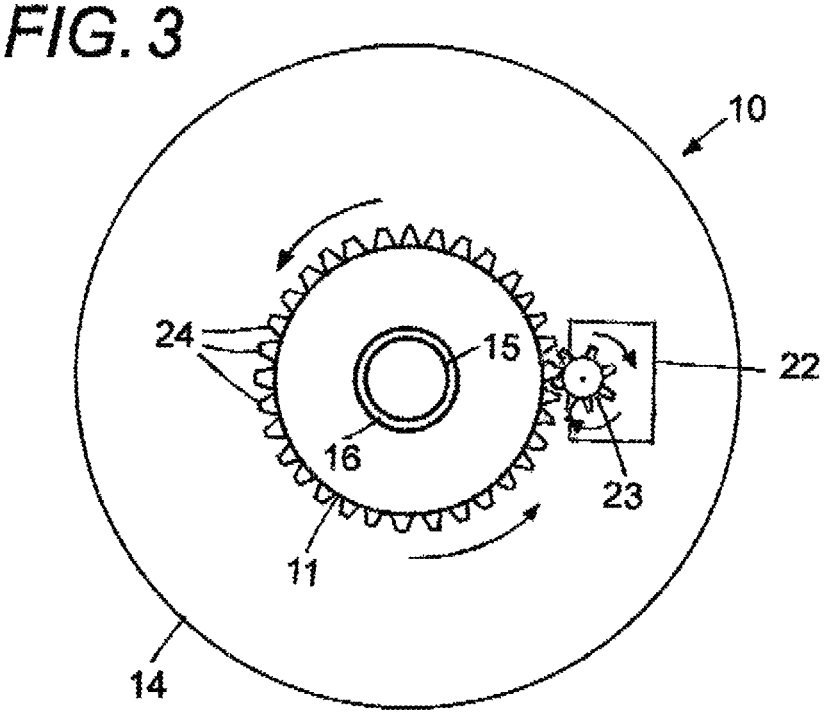
FIG. 3 is a cross-sectional view of the plant housing and watering apparatus of FIGS. 1 and 2 taken along the lines 3-3.

Referring to the drawings, FIG. 1 is a perspective view and FIG. 2 is a cross-sectional view showing an embodiment of a rotating aeroponics system and more specifically, a rotatable, electric-powered self-contained vertical plant housing and watering apparatus 10 of the present invention. FIG. 3 is a cross-sectional view of the plant housing and watering apparatus 10 of FIGS. 1 and 2 taken along the lines 3-3.

The plant housing and watering apparatus 10 generally includes an elongated plant-housing tower 11 having a closed first end 11a, a second end 11b, a hollow interior 12 and a plurality of removable plant plug-supporting cups 13 extending outward from a sidewall 11c of the plant-supporting tower 11. Although the plant-housing tower may be made from various types of durable, waterproof material have different shapes and sizes, plant-housing tower 11 is shown as having a cylindrical shape and constructed of a waterproof, durable plastic.

Although the removable plant plug-supporting cups 13 may extend outward from the sidewall 11c of the plant-supporting tower 11 at all angles, in the embodiment of FIGS. 1-2, each of the plant plug supporting cups 13 is shown preferably extending from the sidewall 11c of the plant-supporting tower 11 at an angle "θ" between a length or central axis 20 of the tower 11, wherein "θ" is preferably between 35-85 degrees. In the embodiment of FIGS. 1 and 2, each plant plug-supporting cups 13 may be made to house a plant plug 13a such as for example a 40×40 mm rockwool cube, used as a plant holding medium and acting to hold a base of the plant and to retain moisture between water cycles.

Supported within the hollow interior 12 of the plant-housing tower 11 in a fixed condition is a water column 14 that extends from proximal to the first end 11a to the second end 11b of the plant-housing tower 11. The water column 14 may include an optional fitted sleeve covering 16 covering an exterior surface of the water column 15 to alleviate root twists within the plant-housing tower 11.

The plant housing and watering apparatus 10 also includes a self-contained water basin 15 connected to the second end 11b of the plant-housing tower 11 and supporting the plant-housing tower 11 in a rotatably upright condition. In the embodiment of FIG. 2, the plant-housing tower 11 is shown supported on a load-bearing roller-bearing system 21 located a bottom surface 14a of the water basin 15. The load-bearing roller-bearing system 21 may comprise a ceramic or rust-resistant metal bearing that functions to enable the free movement or smooth rotation of the plant-housing tower 11 about the water column 15.

FIGS. 1 and 2 also shows that the plant-housing tower 11 is further supported and stabilized vertically to water basin 15 by a centering sheath 17 extended on a lid 14b of the water basin 15. The vertical design or vertical support of the plant-housing tower 11 provides the advantage of maximizing planting capacity in limited spaces.

The self-contained water basin 15 may support a variety of plant related fluids including but not limited to a hydroponic nutrient solution that not only hydrates the plants supported by plant-housing tower 11 but also provides the plants with proper nutrient. The self-contained water basin 15 may also include a drain port 21 for sample collection, testing water pH and nutrient level, or evacuating the contents of the tower and a gauge 25 preferably located on the lid 14b of the water basin 15 to show the current basin water level.

The self-contained water basin 15 may also include a 90-degree hollow tube 46 located on an upper portion of the water basin 15 with the hollow tube 46 exiting a side of the water basin 15 to function as an overflow indicator. The indicator's outflow will be pointed down and may have a mesh filter 46a on the end to deter insect infiltration.

Located within the water basin 14 is a water pump 18, which functions generally to push fluids supported within the water basin 14 up the water column 15 for fluid distribution within the elongated plant-housing tower 11. The water pump 18 preferably functions to push fluids supported within the water basin 14 up the water column 15 for fluid distribution at least proximal to the first end 11a of the plant-housing tower 11, out multiple holes of a fluid distribution outlet 19, and past a water diffuser 33 and cascading back to the water basin 14 to promote maximum plant root saturation while simultaneously delivering a hydroponic nutrient solution that can be adjusted as needed. The self-contained recirculation system of plant housing and watering apparatus 10 promotes minimal water loss when compared with soil growing and elongated times between refilling the basin 14. The water pump 18 may also include an optional water cycle controlling timer 26 connected thereto that functions by turning the water pump 18 on and off at programable intervals.

The plant housing and watering apparatus 10 further includes an electrical motor 22 driving a rotation of the plant-housing tower 11 about the water column 15 and the central axis 20 of the plant-housing tower 11 to provide the plants supported on all sides or surfaces of the elongated plant-housing tower 11 with equal sunlight from all angles, maximizing photosynthesis and intermittent shading to prevent sunburn on plant surfaces. This ensures all plants supported on the plant-housing tower 11 have equal access and breaks from sunshine and wind while in operation. Motor 22 is preferably programable to facilitate the rotation of the plant-housing tower 11 at fixed intervals, adjustable intervals, continuously, or during only light hours for power conservation which may be accomplished through the use of a light sensitive switch or the like that ceases rotation of the plant-housing tower 11 when it is dark, and then automatically initiates rotation of the plant-housing tower 11 during daylight hours.

Although the motor used to drive a rotation of the plant-housing tower 11 about the water column 15 and the central axis 20 of the plant-housing tower may include a variety of devices and components, the motor 22 of plant housing and watering apparatus 10 is shown in FIGS. 2 and 3 as including a motor-powered drive gear 23 that rotatably engages a plurality of teeth 24 forming a gear ring located on a circumference of the plant-housing tower 11 proximal to the second end 11b of the plant-housing tower 11 to facilitate the rotation of the plant-housing tower 11. Although the motor 22 is shown housed within the water basin 14 to protect the motor 22 from various environmental conditions, alternative embodiments of the present invention may include a motor located external the water basin 14.

Figure 3A:
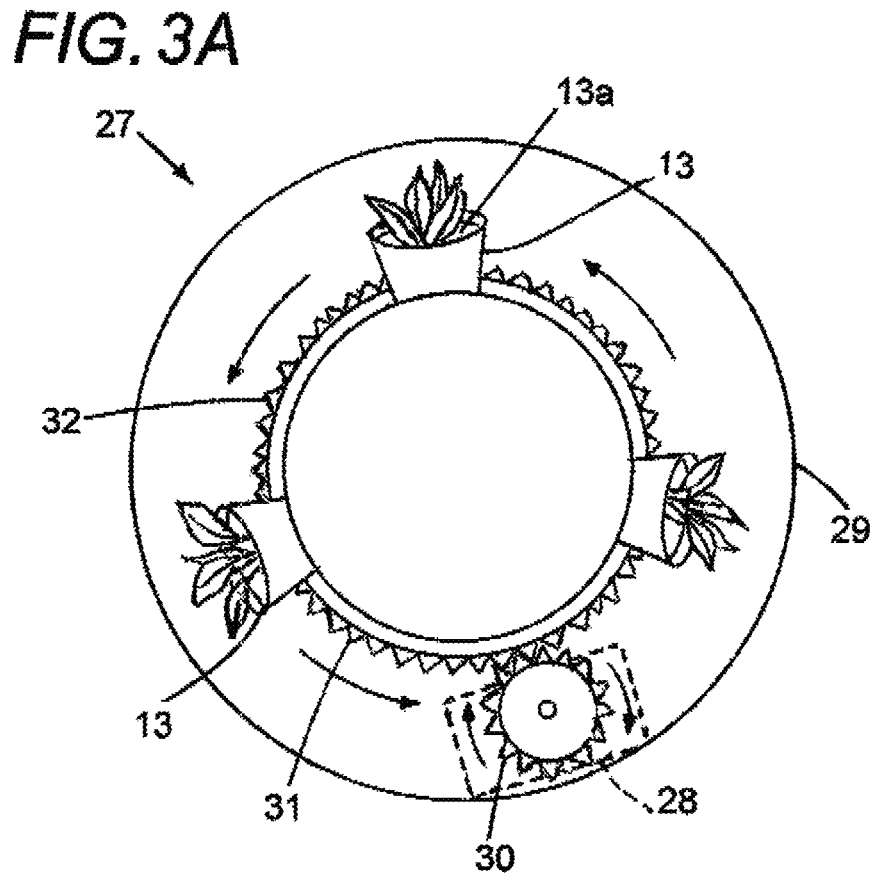
FIG. 3A is a top view showing an alternative embodiment of a plant housing and watering apparatus having a motor located external to a water basin.

FIG. 3A is a top view showing an alternative embodiment of a plant housing and watering apparatus 27 of the present invention having similar main components to the plant housing and watering apparatus 10 of FIGS. 1-3. However, instead of having the motor 22 housed within the water basin 14, FIG. 3A shows a n electric motor 28 located external to a water basin 29 with the motor 28 including a motor-powered drive gear 30 that rotatably engages a plurality of teeth 31 that forms a gear ring located on a circumference of the plant-housing tower 32 to facilitate the rotation of the plant-housing tower 32 about a central axis (not shown) of a length of the plant-housing tower 32. FIG. 3A also shows an embodiment of each of the plant plug supporting cup 13 having tapered body to prevent a plant plug 13a from completely sliding through the supporting plant plug supporting cup 13.

Figure 4:
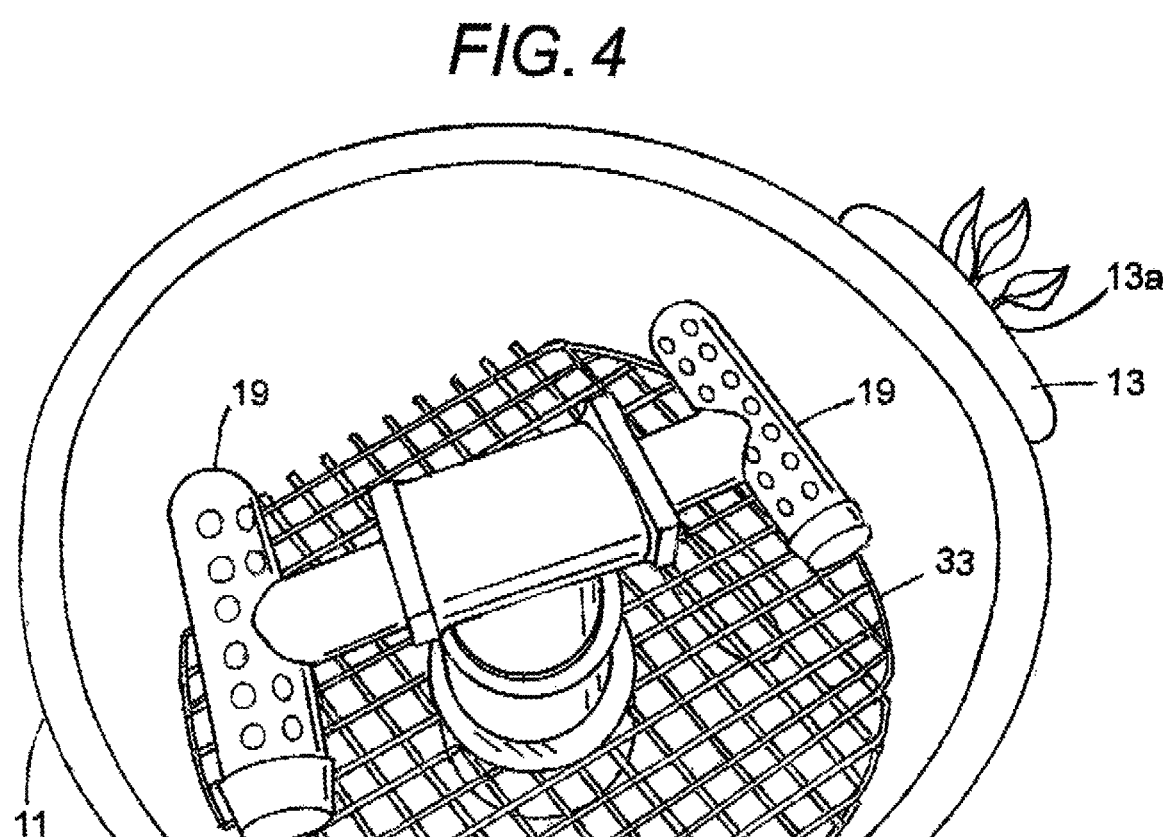
FIG. 4 is a partial perspective view of an exposed first end of the plant-housing tower of FIG. 1.

FIG. 4 is a partial perspective view of an exposed first end 11a of the plant-housing tower 11 of FIG. 1 showing the fluid distribution outlet 19 having multiple holes for fluid access therethrough from the water column 15 and the water diffuser 33 generally comprising an aeration mesh screen to further spread out or distribute fluid exiting from the holes of the fluid distribution outlet 19 before the fluid cascades back to the water basin 14.

Figure 5:
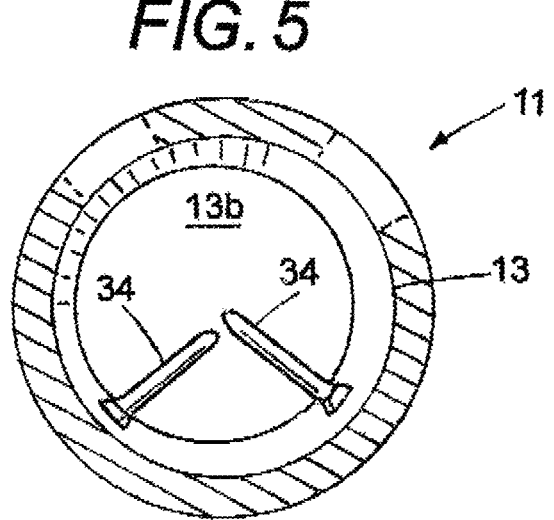
FIG. 5 is a close-up partial side view showing the plant-housing tower along with a removable plant plug-supporting cup.

FIG. 5 is a close-up partial side view showing the plant-housing tower 11 along with a removable plant plug-supporting cup 13. The plant plug-supporting cup 13 is shown having an optional stopper in the form of a pair of spaced plastic rods 34 each extending through a portion of an interior 13b of the plant plug-supporting cup 13 to prevent the plant plug 13a from completely sliding through the plant plug supporting cup 13.

Figure 6:
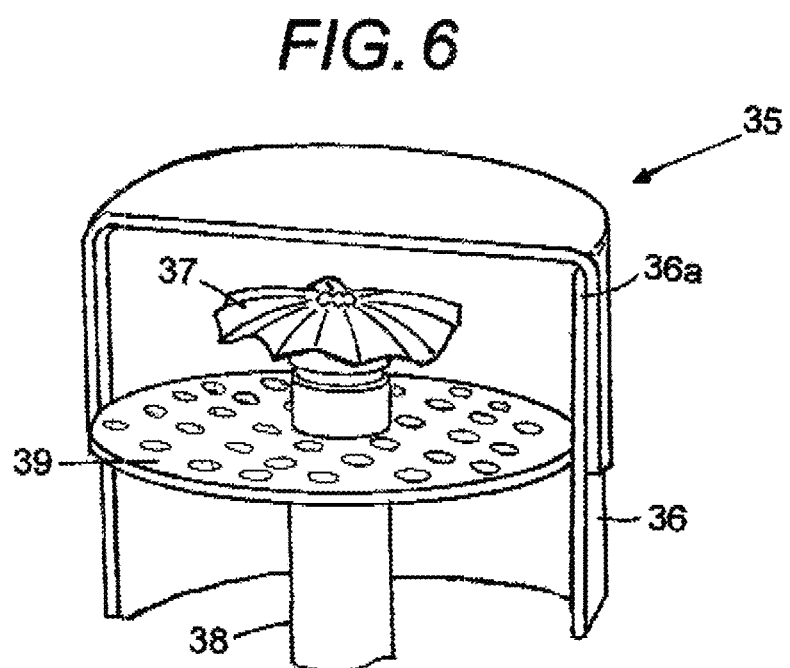
FIG. 6 is a partial cut-out view exposing a first end of a plant-housing tower of a plant housing and watering apparatus having a fan-type fluid distribution outlet.

FIG. 6 is a partial cut-out view exposing a first end 36a of a plant-housing tower 36 of an alternative embodiment of a plant housing and watering apparatus 35 having a fan-type fluid distribution outlet 37 for fluid access and distribution therethrough from a water column 38 and a screen plate diffuser 39, which functions to further spread out or distribute fluid exiting from the fan-type fluid distribution outlet 37 before the fluid cascades back to a water basin.

Figure 7:
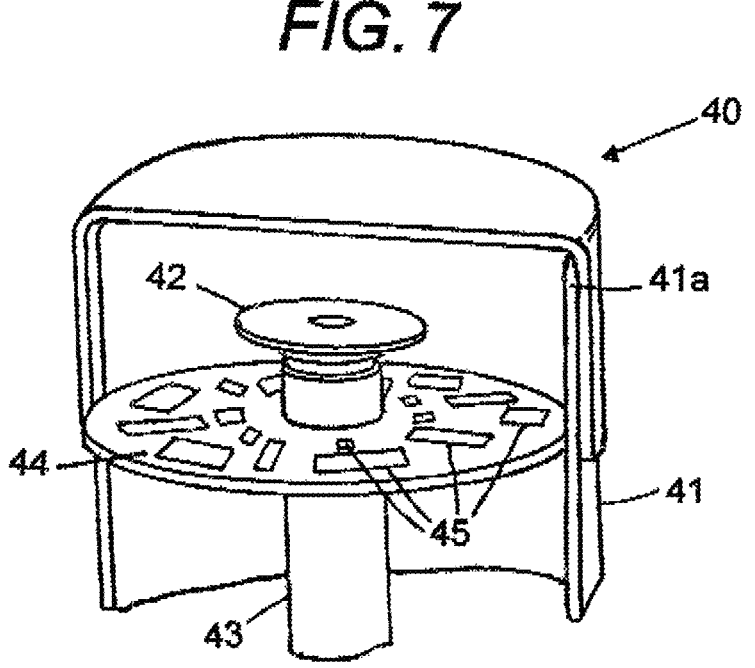
FIG. 7 is a partial cut-out view exposing a first end of a plant-housing tower of a plant housing and watering apparatus having a spout-type fluid distribution outlet.

FIG. 7 is a partial cut-out view exposing a first end 41a of a plant-housing tower 41 of an alternative embodiment of a plant housing and watering apparatus 40 having a spout-type fluid distribution outlet 42 for fluid access and distribution therethrough from a water column 43 and a screen plate diffuser 44 having multiple sets of fluid distributing orifices extending therethrough 45, which functions to further spread out or distribute fluid exiting from the fan-type fluid distribution outlet 42 before the fluid cascades back to a water basin.

Figure 8:
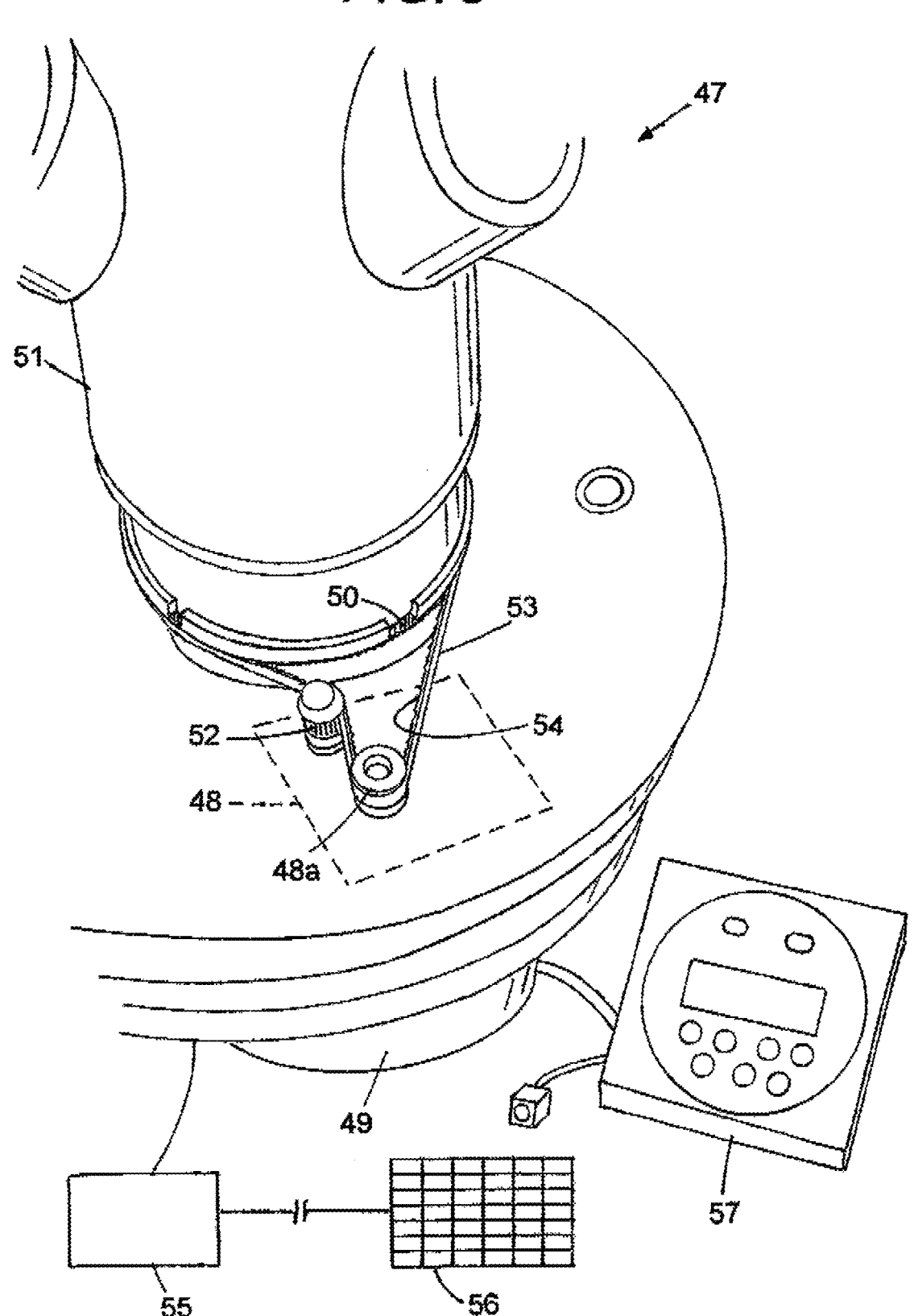
FIG. 8 is a close-up perspective view showing an alternative embodiment of a plant housing and watering apparatus.

FIG. 8 is a close-up perspective view showing an alternative embodiment of a plant housing and watering apparatus 47 of the present invention having similar main components to the plant housing and watering apparatus 10 of FIGS. 1-3. However, FIG. 8 shows plant housing and watering apparatus 47 having a motor 48 partially housed within a water basin 49 with the motor 48 including a motor-powered drive shaft 48a located on top of and external to the water basin 49. The motor-powered drive shaft 48a along with a belt tensioner 52 is shown engaging a drive belt 53 having a plurality of teeth 54 that rotatably engages a plurality of teeth 50 located on a circumference of a plant-housing tower 51 to facilitate the rotation of the plant-housing tower 51 about a central axis (not shown) of a length of the plant-housing tower 51. Plant housing and watering apparatus 47 is also shown including a rechargeable battery 55 connected to a solar panel 56 for powering the motor 48 and a water pump (not shown) located within the water basin 49 and a programable timer 57 for controlling both the motor 48 and a water pump.

I claim:

1. A rotatable, electric powered self-contained vertical plant housing and watering apparatus comprising:

an elongated, rotatable plant-housing tower having a closed first end, a second end, a hollow interior and a plurality of plant plug-supporting cups extending outward from a sidewall of the plant-supporting tower with each of the plant plug-supporting cups angled between 35-85 degrees to a length of the tower;

a water column supported within the hollow interior of the plant-housing tower in a fixed condition, the water column running from proximal the first end to proximal the second end of the plant-housing tower;

a self-contained water basin connected to the second end of the plant-housing tower and supporting the plant-housing tower in a rotatably upright condition with the plant-housing tower supported on a load-bearing roller-bearing system located with the water basin and stabilized vertically by an extended sleeve located on a lid of the water basin;

a centering sheath extending from the lid of the water basin and engaging a portion of a surface of the sidewall of the plant-housing tower to support and vertically stabilize the plant-housing tower;

a one-piece fitted sleeve covering an exterior surface of the water column and extending from proximal to a first end to proximal to a second end of the water column to alleviate root twists within the plant-housing tower;

a water pump located within the water basin and pushing fluid supported within the water basin up the water column for fluid distribution within the elongated plant-housing tower; and a motor driving a rotation of the plant-housing tower about the water column to provide all sides of the elongated plant-housing tower with equal sun and shade time.

2. The plant housing and watering apparatus of claim 1 wherein the motor driving the rotation of the plant-housing tower about the water column includes a motor-powered drive gear engaging a plurality of teeth located on a circumference of the plant-housing tower proximal to the second end of the plant-housing tower.

3. The plant housing and watering apparatus of claim 2 wherein each of the plant plug supporting cups includes a stopper preventing a plant plug supported by the plant plug supporting cup from completely sliding through the plant plug supporting cup.

4. The plant housing and watering apparatus of claim 3 wherein the stopper of the plant plug supporting cup comprises a pair of spaced plastic rods each having a free end extending through a portion of an interior of the plant plug-supporting cup.

5. The plant housing and watering apparatus of claim 2 wherein each of the plant plug supporting cups are tapered to prevent a plant plug supported by the plant plug supporting cup from completely sliding through the plant plug supporting cup.

6. The plant housing and watering apparatus of claim 3 including a water cycle controlling timer functioning to turn the water pump on and off at programable intervals.

7. The plant housing and watering apparatus of claim 6 wherein the water pump pushes fluid supported within the basin up the water column for fluid distribution at least proximal to the first end of the plant-housing tower, out multiple holes, past a water diffuser and cascading back to the water basin to promote maximum plant root saturation while simultaneously delivering a hydroponic nutrient solution that can be adjusted as needed.

8. The plant housing and watering apparatus of claim 7 wherein the motor comprises a programable motor rotating the plant-housing tower at fixed intervals, adjustable intervals, continuously or during only light hours for power conservation.

9. A rotatable, electric powered self-contained vertical plant housing and watering apparatus comprising:

an elongated plant-housing tower having a closed first end, a second end, a hollow interior and a plurality of plant plug-supporting cups extending outward from a sidewall of the plant-supporting tower;

a pair of spaced plastic rods located in each of the plant plug-supporting cups with each of the plastic rod having a free end extending through a portion of an interior of the plug-supporting cup to prevent a plant plug from completely sliding through the plant plug-supporting cup;

a water column supported within the hollow interior of the plant-housing tower in a fixed condition, the water column running from proximal the first end to proximal the second end of the plant-housing tower;

a self-contained water basin connected to the second end of the plant-housing tower and supporting the plant-housing tower in a rotatably upright condition;

a centering sheath extending from a lid of the water basin and engaging a portion of a surface of the sidewall of the plant-housing tower to support and vertically stabilize the plant-housing tower;

a one-piece fitted sleeve covering an exterior surface of the water column and extending from proximal to a first end to proximal to a second end of the water column to alleviate root twists within the plant-housing tower;

a water pump located within the basin and pushing fluid supported within the basin up the water column for fluid distribution within the elongated plant-housing tower; and a motor driving a rotation of the plant-housing tower about the water column and a central axis of the plant-housing tower to provide all sides of the elongated plant-housing tower with equal sun and shade time.

10. The plant housing and watering apparatus of claim 9 wherein each of the plant plug supporting cups is angled between 35-85 degrees to a length of the tower.

11. The plant housing and watering apparatus of claim 9 including a water cycle controlling timer functioning to turn the water pump on and off at programable intervals.

12. The plant housing and watering apparatus of claim 9 wherein the water pump pushes fluid supported within the basin up the water column for fluid distribution at least proximal to the first end of the plant-housing tower, out multiple holes, and past a water diffuser and cascading back to the water basin to promote maximum plant root saturation while simultaneously delivering a hydroponic nutrient solution that can be adjusted as needed.

13. The plant housing and watering apparatus of claim 9 wherein the plant-housing tower is supported on a load-bearing roller-bearing system.

14. The plant housing and watering apparatus of claim 9 wherein the motor comprises a programable motor rotating the plant-housing tower at fixed intervals, adjustable intervals, continuously or during only light hours for power conservation.

15. The plant housing and watering apparatus of claim 9 wherein the self-contained water basin includes a drain port providing sample collection, testing water pH and nutrient level, or evacuating the contents of the tower.

16. The plant housing and watering apparatus of claim 9 wherein the motor driving the rotation of the plant-housing tower about the water column and a central axis of the plant-housing tower includes a motor-powered drive gear engaging a plurality of teeth located on a circumference of the plant-housing tower proximal to the second end of the plant-housing tower.

17. A rotatable, electric powered self-contained vertical plant housing and watering apparatus comprising:

an elongated plant-housing tower having a closed first end, a second end, a hollow interior and a plurality of plant plug-supporting cups extending outward from a sidewall of the plant-supporting tower with each of the plant plug-supporting cups angled between 35-85 degrees to a length of the tower;

a pair of spaced plastic rods located in each of the plant plug-supporting cups with each of the plastic rod having a free end extending through a portion of an interior of the plug-supporting cup to prevent a plant plug from completely sliding through the plant plug-supporting cup;

a water column supported within the hollow interior of the plant-housing tower in a fixed condition, the water column running from proximal the first end to proximal the second end of the plant-housing tower;

a one-piece fitted sleeve covering an exterior surface of the water column and extending from proximal to a first end to proximal to a second end of the water column to alleviate root twists within the plant-housing tower;

a self-contained water basin connected to the second end of the plant-housing tower and supporting the plant-housing tower in a rotatably upright condition with the plant-housing tower supported on a load-bearing roller-bearing system located with the water basin;

a centering sheath extending from a lid of the water basin and engaging a portion of a surface of the sidewall of the plant-housing tower to support and vertically stabilize the plant-housing tower;

a water pump located within the basin and pushing fluid supported within the basin up the water column for fluid distribution at least proximal to the first end of the plant-housing tower and cascading back to the water basin to promote maximum plant root saturation;

a water cycle controlling timer turning the water pump on and off at programable intervals; and a programable motor driving a rotation of the plant-housing tower about the water column and a central axis of the plant-housing tower at fixed intervals, adjustable intervals, continuously or during only light hours for power conservation to provide all sides of the elongated plant-housing tower with equal sun and shade time, the programable motor including a motor-powered drive gear engaging a plurality of teeth located on a circumference of the plant-housing tower proximal to the second end of the plant-housing tower.

\* \* \* \* \*